(12) United States Patent
Fukaya et al.

(10) Patent No.: US 8,271,170 B2
(45) Date of Patent: Sep. 18, 2012

(54) CLUTCH CONTROL SYSTEM FOR VEHICLE

(75) Inventors: Kazuyuki Fukaya, Saitama (JP);
Yoshiaki Tsukada, Saitama (JP);
Takashi Ozeki, Saitama (JP); Hiroyuki Kojima, Saitama (JP); Yoshiaki Nedachi, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 878 days.

(21) Appl. No.: 12/262,549

(22) Filed: Oct. 31, 2008

(65) Prior Publication Data

US 2009/0143949 A1    Jun. 4, 2009

(30) Foreign Application Priority Data

Nov. 30, 2007    (JP) ................. 2007-310927

(51) Int. Cl.
*G06F 7/00*    (2006.01)
*G06F 17/00*    (2006.01)
*G06F 19/00*    (2006.01)

(52) U.S. Cl. .......................... 701/68; 701/67

(58) Field of Classification Search .......... 180/218, 180/219, 230; 701/67, 68; 192/3.29, 3.3, 192/3.31, 3.33, 48.601–48.608, 48.611–48.619, 192/85.81, 85.38, 85.63, 103 A, 103 F, 103 FA
See application file for complete search history.

(56) References Cited

U.S. PATENT DOCUMENTS

| 5,644,916 A | 7/1997 | Hayasaki |
| 6,018,198 A | 1/2000 | Tsuzuki et al. |
| 2006/0089232 A1* | 4/2006 | Kobayashi et al. ............ 477/70 |
| 2006/0162979 A1* | 7/2006 | Usukura et al. .............. 180/230 |

FOREIGN PATENT DOCUMENTS

| JP | 46-32202 | 9/1971 |
| JP | 2001-193763 A | 7/2001 |
| JP | 2001-349419 A | 12/2001 |
| JP | 2003-56687 A | 2/2003 |
| JP | 2003-148515 A | 5/2003 |
| JP | 2007-024079 A | 2/2007 |
| JP | 2007-92813 A | 4/2007 |
| JP | 2007-225043 A | 9/2007 |

* cited by examiner

*Primary Examiner* — Jeffrey Shapiro
(74) *Attorney, Agent, or Firm* — Birch, Stewart, Kolasch & Birch, LLP

(57) ABSTRACT

In a clutch control system for a vehicle having a hydraulic type clutch in the course of power transmission between an engine and a drive wheel the operational response of the clutch is enhanced and the influence of a hysteresis present in oil pressure-stroke characteristic is suppressed. When the clutch is disconnected, a control oil pressure thereof is maintained at a predetermined stand-by oil pressure (allowance compensating oil pressure) P1. At the time of connecting the clutch, the control oil pressure is increased to a predetermined connection oil pressure P2. In bringing the clutch from the connected state into the disconnected state, the control oil pressure is lowered to an oil pressure P3 being below the stand-by oil pressure P1 and being near 0, and is thereafter increased again to the stand-by oil pressure P1.

20 Claims, 6 Drawing Sheets

US 8,271,170 B2

CLUTCH CONTROL SYSTEM FOR VEHICLE

CROSS-REFERENCE TO RELATED APPLICATIONS

The present application claims priority under 35 USC 119 to Japanese Patent Application No. 2007-310927 filed on Nov. 30, 2007 the entire contents of which are hereby incorporated by reference.

BACKGROUND OF THE INVENTION

1. Field of the Invention

The present invention relates to a clutch control system for a vehicle.

2. Description of Background Art

A clutch control system for a vehicle is known wherein a hydraulic type clutch is put into a connected state by a supply of oil pressure which is supplied externally. A clutch control system is known wherein oil pressure is varied stepwise through different characteristics until a desired clutch control oil pressure is reached. See, for example, Japanese Patent Laid-open No. 2003-56687.

In the case of a hydraulic type clutch which is put into a connected state by a supply of oil pressure which is supplied externally, a stand-by oil pressure corresponding to an allowance pressure (ineffective pressure) may be supplied at the time of the clutch disconnection in order to enhance the operation response. In this case, even if the clutch control oil pressure is simply lowered from the clutch connected condition to the stand-by oil pressure, the clutch may not be completely disconnected but may be dragged under the influence of a hysteresis present in the oil pressure-stroke characteristic. Thus, there is a need for an improvement with respect to this problem.

SUMMARY AND OBJECTS OF THE INVENTION

It is an object of an embodiment of the present invention, in connection with a clutch control system for a vehicle having a hydraulic type clutch in the course of a power transmission path between an engine and a drive wheel, to enhance the operation response of the clutch and to suppress the influence of a hysteresis present in the oil pressure-stroke characteristic.

According to an embodiment of the present invention, a clutch control system for a vehicle (for example, a motorcycle 1) includes a hydraulic type clutch (for example, a twin clutch 26) which is provided in the course of a power transmission path between an engine 13 to a drive wheel 11. The hydraulic type clutch is put into a connected state by a supply of oil pressure which is supplied externally. A control oil pressure is maintained at a predetermined stand-by oil pressure (for example, a stand-by oil pressure P1) when the clutch is disconnected, whereas the control oil pressure is increased to a predetermined connection oil pressure (for example, a connection oil pressure P2) when the clutch is connected. The control oil pressure is lowered to an oil pressure (for example, an oil pressure P3) being below the stand-by oil pressure and being near 0 and is thereafter increased again to the stand-by oil pressure, at the time of bringing the clutch from the connected state to the disconnected state.

According to an embodiment of the present invention, the control oil pressure is lowered to the oil pressure being below the stand-by oil pressure and being near 0 and is thereafter increased again to the stand-by oil pressure, at the time of bringing the clutch from the connected state to the disconnected state in the case where it is detected through detection of the vehicle speed of the vehicle that the vehicle is in a stopped state.

According to an embodiment of the present invention, the stand-by oil pressure is an oil pressure for compensating an allowance pressure (ineffective pressure) at the clutch.

According to an embodiment of the present invention, the clutch is a twin clutch of a twin-clutch type transmission control system in which a gear shift is made by shifting from one of a pair of clutches (for example, first and second clutches 51a and 51b) to the other.

According to an embodiment of the present invention, the control oil pressure is kept at a predetermined stand-by oil pressure when the clutch is disconnected, whereby it is made possible to cancel the chattering and an operating reaction force of the clutch and to exert a pre-load onto the oil pressure line (to compensate the allowance pressure), thereby enhancing the operation response at the time of clutch connection.

In addition, at the time of bringing the clutch from the connected state into the disconnected state, the control oil pressure is lowered to an oil pressure being below the stand-by oil pressure and being near 0 (near the atmospheric pressure) and is thereafter increased again to the stand-by oil pressure, whereby the clutch can be completely disconnected while obviating the influence of a hysteresis present in oil pressure-stroke characteristic, and the clutch can be prevented from being dragged under the influence of the hysteresis.

According to an embodiment of the present invention, dragging of the clutch can be securely prevented from occurring when the vehicle is stopped.

According to an embodiment of the present invention, the operation response at the time when the clutch is connected can be enhanced efficiently.

According to an embodiment of the present invention, in a twin clutch needing stand-by in a disconnected state before connection of the clutch, it is possible to suppress the operational delay at the time of shifting from one clutch to the other and to prevent the clutch from being dragged at the time of stand-by.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
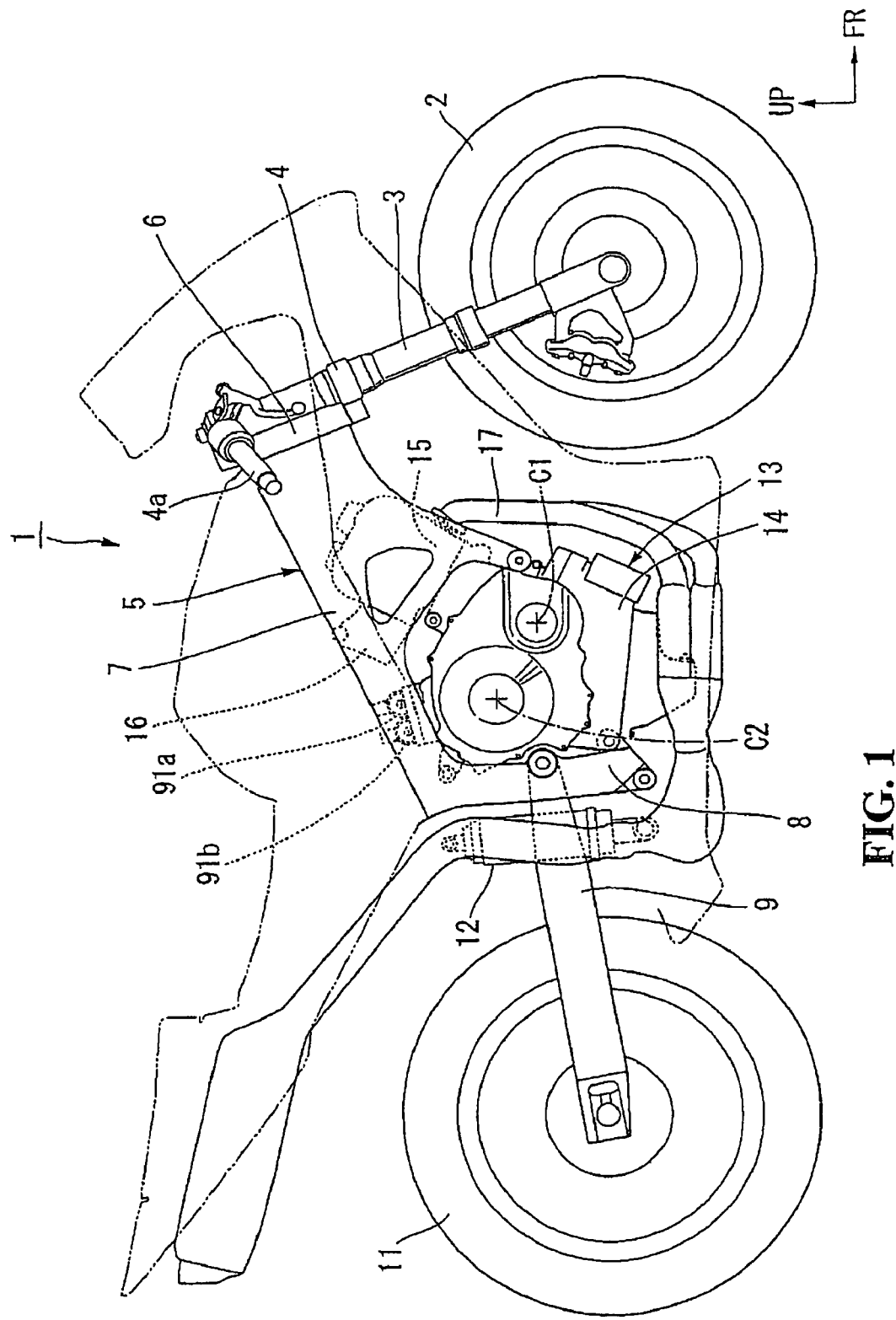
FIG. 1 is a right side view of a motorcycle in an embodiment of the present invention.

Now, an embodiment of the present invention will be described below referring to the drawings. The front, rear, left, right sides and the like in the following description are the same as those with respect to the vehicle unless otherwise specified. In the figures, arrow FR indicates the forward direction (front side) with respect to the vehicle, arrow LH indicates the leftward direction (left side) with respect to the vehicle, and arrow UP indicates the upward direction (upper side) with respect to the vehicle.

As shown in FIG. 1, an upper part of a front fork 3 rotatably supporting a front wheel 2 of a motorcycle (saddle ride type vehicle) 1 is steeringly rotatably supported on a head pipe 6 at a front end part of a body frame 5 through a steering stem 4. A steering handle 4a is attached to an upper part of the steering stem 4 (or the front fork 3). From the head pipe 6, a main frame 7 extends rearwards to be connected to a pivot plate 8. Front end parts of swing arms 9 are vertically swingably supported on the pivot plate 8, and a rear wheel 11 is rotatably supported on rear end parts of the swing arms 9. Shock absorbers 12 are interposed between the swing arms 9 and the body frame 5. An engine (internal combustion engine) 13 as a prime mover for the motorcycle 1 is suspended on the inner side of the body frame 5.

Figure 2:
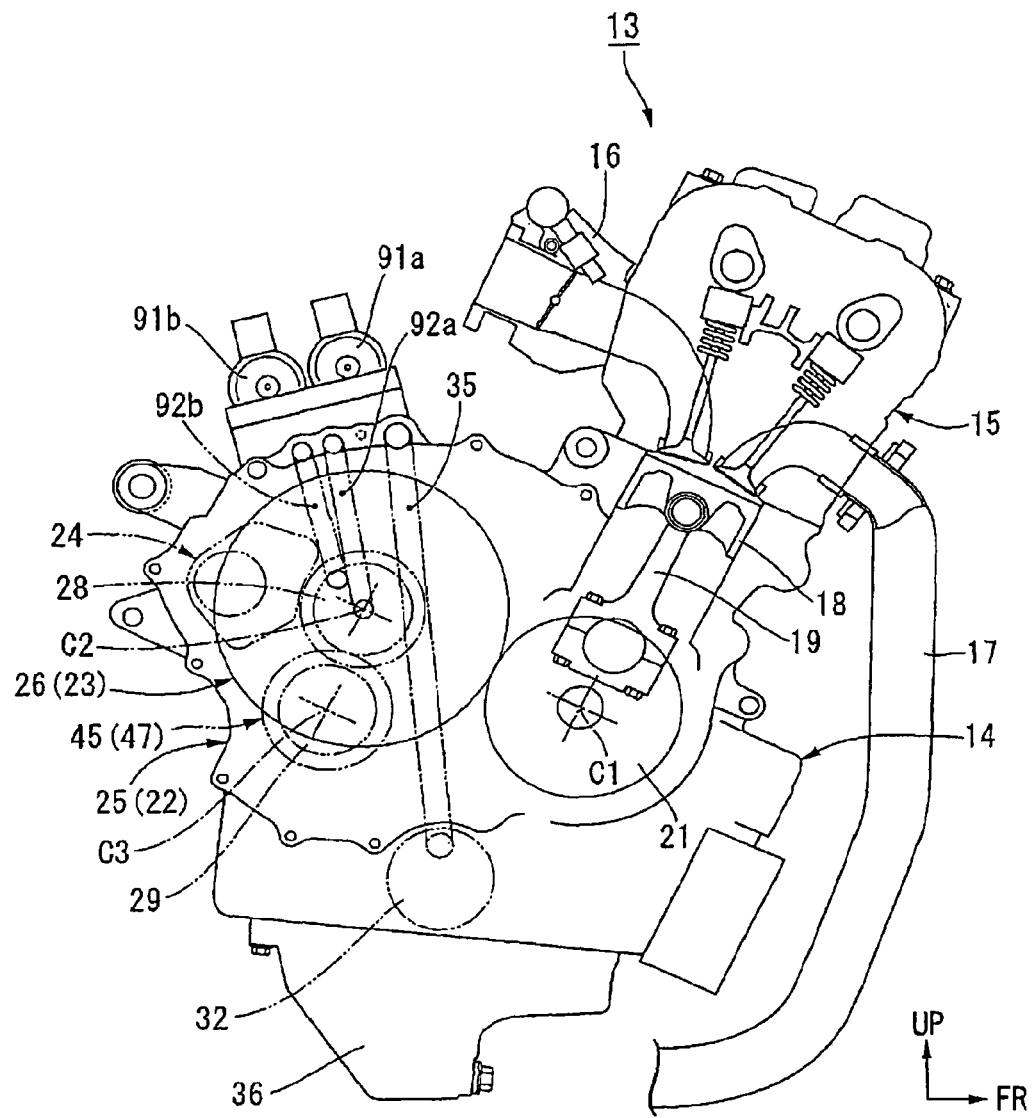
FIG. 2 is a right side view of an engine of the motorcycle.

Referring to FIG. 2, the engine 13 is a parallel 4-cylinder engine with the rotational center axis C1 of a crankshaft 21 set along the vehicle width direction (left-right direction), wherein a cylinder 15 is erected on a crankcase 14, a piston 18 corresponding to each cylinder is reciprocatably fitted in the cylinder 15, and the reciprocation of each piston 18 is converted through a connecting rod 19 into a rotational motion of the crankshaft 21. A throttle body 16 is connected to a rear part of the cylinder 15, and an exhaust pipe 17 is connected to a front part of the cylinder 15.

A transmission case 22 is integrally connected to the rear side of the crankcase 14, and a twin-clutch type transmission 23 and a change mechanism 24 are contained in the transmission case 22. A right side part of the transmission case 22 is made to be a clutch case 25, and a twin clutch 26 of the twin-clutch type transmission 23 is contained in the clutch case 25. The rotational power of the crankshaft 21 as a power source of the engine 13 is outputted through the twin-clutch type transmission 23 to the left side of the transmission case 22, and is then transmitted to the rear wheel 11 through a chain-type power transmission mechanism, for example. In addition, symbols C2 and C3 in the figure denote respectively the rotational center axes of a main shaft 28 and a counter shaft 29 of the twin-clutch type transmission 23.

Figure 3:
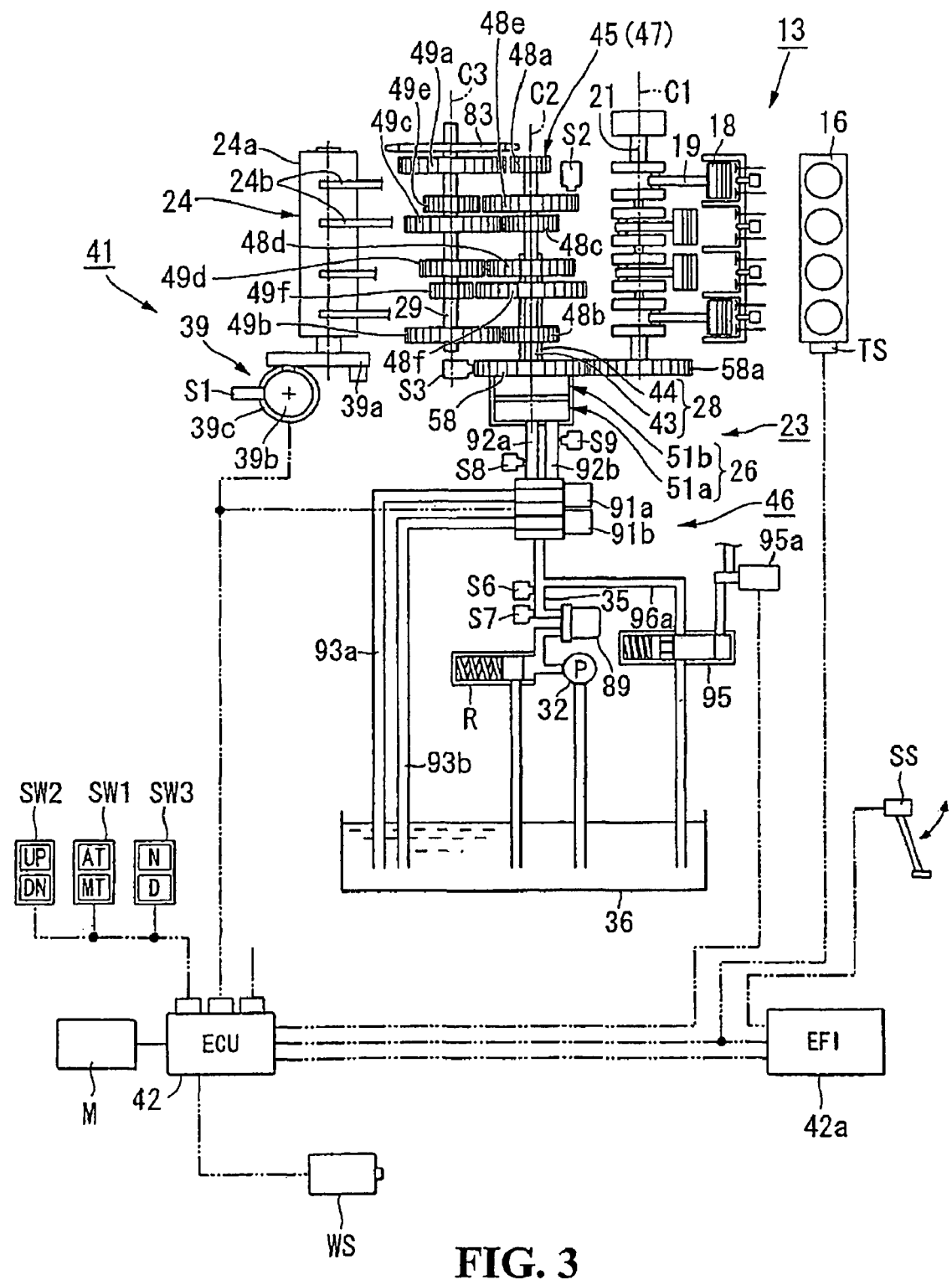
FIG. 3 is a block diagram of a twin-clutch type transmission control system of the motorcycle.

As shown in FIG. 3, the motorcycle 1 has a twin-clutch type transmission control system which is composed mainly of the twin-clutch type transmission 23 connected to the engine 13, a gear shift device 41 having a drive mechanism 39 provided for the change mechanism 24, and an electronic control unit (ECU) 42 for controlling the operations of the twin-clutch type transmission 23 and the gear shift device 41.

Figure 4:
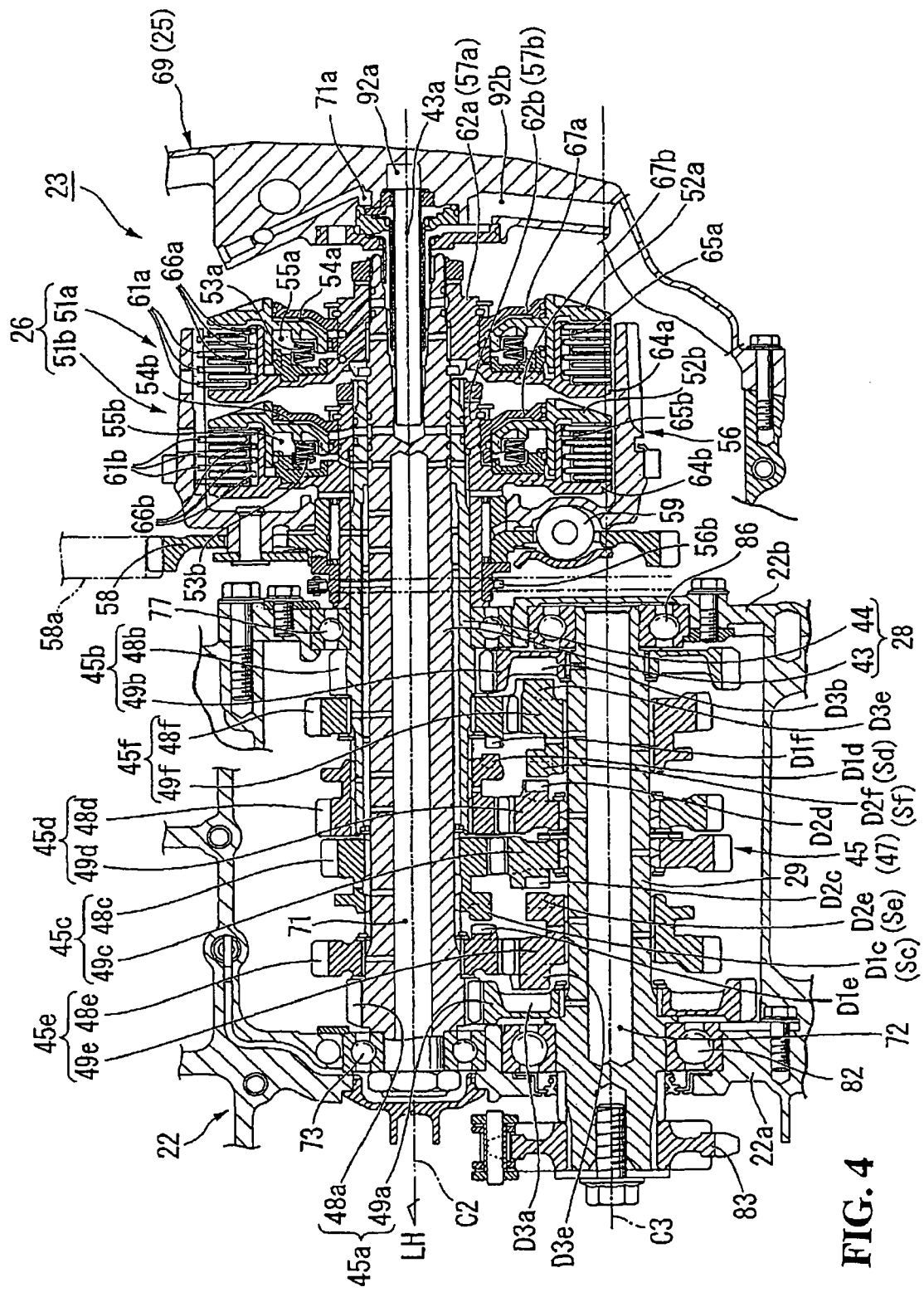
FIG. 4 is a sectional view of a twin-clutch type transmission of the motorcycle.

Referring to FIG. 4, the twin-clutch type transmission 23 includes the main shaft 28 having the double structure composed of the inner and outer shafts 43, 44; the counter shaft 29 disposed in parallel to the main shaft 28; a speed change gear group 45 bridgingly arranged between the main shaft 28 and the counter shaft 29; the twin clutch 26 coaxially disposed at a right end part of the main shaft 28 and an oil pressure supply system 46 for supplying a working oil pressure to the twin clutch 26. Hereinafter, the assembly composed of the main shaft 28, the counter shaft 29 and the speed change gear group 45 will be referred to as a transmission 47.

The main shaft 28 has a structure in which a right side part of the inner shaft 43 extending between left and right parts of the transmission case 22 is relatively rotatably inserted in the outer shaft 44. Drive gears 48a-48f for six gear speeds in the speed change gear group 45 are distributedly arranged at the outer peripheries of the inner and outer shafts 43 and 44. On the other hand, driven gears 49a to 49f for six gear speeds in the speed change gear group 45 are arranged at the outer periphery of the counter shaft 29. The drive gears 48a to 48f and the driven gears 49a to 49f are meshed with each other at corresponding shift positions, respectively, to constitute speed change gear pairs 45a to 45f corresponding to the shift positions, respectively. In addition, the speed change gear pairs 45a to 45f are reduced in reduction gear ratio (increased in gear speed) in the order of from the 1st speed to the 6th speed.

A left end part of the inner shaft 43 extends to reach a left side wall 22a of the transmission case 22, and is rotatably borne on the left side wall 22a through a ball bearing 73.

On the other hand, a right side part of the inner shaft 43 penetrates through a right side wall 22b of the transmission case 22 to be exposed in the inside of the clutch case 25, and an intermediate part in the left-right direction of the inner shaft 43 is rotatably borne on the right side wall 22b of the transmission case 22 through an intermediate part in the left-right direction of the outer shaft 44, which similarly penetrates the right side wall 22b, and through a ball bearing 77.

The outer shaft 44 is shorter than the inner shaft 43, and its left end part is terminated at an intermediate part in the left-right direction of the transmission case 22. The drive gears 48b, 48d, and 48f corresponding to even-ordinal shift positions (2nd, 4th, and 6th speeds) among the speed change gear group 45 are supported on that portion of the outer shaft 44 which is located on the left side relative to the right side wall 22b, in the order of the 4th speed, the 6th speed, and the 2nd speed from the left side. On the other hand, the drive gears 48a, 48c, and 48e corresponding to odd-ordinal shift positions (1st, 3rd, and 5th speeds) among the speed change gear group 45 are supported on that portion of the inner shaft 43 which is located on the left side relative to the left end part of the outer shaft 44, in the order of the 1st speed, the 5th speed, and the 3rd speed from the left side.

Left and right end parts of the counter shaft 29 are rotatably borne on the left and right side walls 22a and 22b of the transmission case 22 through ball bearings 82 and 86, respectively. A left end part of the counter shaft 29 protrudes to the left side of the left side wall 22a, and a drive sprocket 83 of a mechanism for transmission of power to the rear wheel 11 is attached to the left end part.

The driven gears 49a to 49f corresponding to the shift positions among the speed change gear group 45 are supported on that portion of the counter shaft 29 which is located on the inside of the transmission case 22, in the same order as that of the drive gears 48a to 48f.

The main shaft 28 (inner shaft 43) and the counter shaft 29 are provided therein with main supply oil passages 71 and 72 through which oil pressures from a main oil pump (not shown) for feeding an oil under pressure to component parts in the engine 13 can be supplied, and an engine oil is supplied through the main supply oil passages 71 and 72 to the speed change gear group 45, as required.

The twin clutch 26 has hydraulic type first and second disk clutches (hereinafter, they may be referred to simply as the clutches) 51a and 51b which are disposed coaxially with and adjacently to each other, and the inner and outer shafts 43 and 44 are coaxially connected to the clutches 51a and 51b, respectively. A clutch outer 56 possessed by the clutches 51a and 51b in common is coaxially provided with a primary driven gear 58 meshed with a primary drive gear 58a of the crankshaft 21, and a rotational driving force from the crankshaft 21 is inputted to the clutch outer 56 through these gears 58 and 58a. The rotational driving force inputted to the clutch outer 56 is transmitted individually to the inner and outer shafts 43 and 44 according to the connected/disconnected states of the clutches 51a and 51b. The connected/disconnected states of the clutches 51a and 51b are individually controlled by the presence/absence of the supply of an oil pressure from the oil pressure supply system 46.

One of the clutches 51a and 51b is set in the connected state, whereas the other is set in the disconnected state, and any of the speed change gear pairs that is connected to one of the inner and outer shafts 43 and 44 is used, to thereby conduct power transmission in the transmission 47. Thereafter, the speed change gear pair to be used next is preliminarily selected from among the speed change gear pairs connected to the other of the inner and outer shafts 43 and 44, and, starting from this condition, the one of the clutches 51a and 51b is put into the disconnected state, whereas the other is put into the connected state, whereby the power transmission in the transmission is changed over to one using the preliminarily selected one of the speed change gear pairs. Consequently, a shift-up or a shift-down in the transmission 47 is achieved.

As shown in FIG. 3, the oil pressure supply system 46 includes a clutch oil pump 32 as an oil pressure generation source for the twin clutch 26; a feed oil passage 35 extending from a discharge port of the clutch oil pump 32; first and second clutch actuators 91a and 91b connected to the downstream side of the feed oil passage 35; and first and second supply oil passages 92a and 92b extending from the clutch actuators 91a and 91b to connection-side oil pressure chambers 54a and 54b (see FIG. 4) of the clutches 51a and 51b, respectively.

The clutch oil pump 32 is provided separately from the main oil pump, and is operative to suck in the engine oil from the inside of an oil pan 36 on the lower side in the crankcase 14 and to discharge the engine oil into the feed oil passage 35. The feed oil passage 35 is provided therein with an oil filter 89 for exclusive use for the oil passage.

In FIG. 3, S6 and S7 denote an oil pressure sensor and an oil temperature sensor for detecting the oil pressure and the oil temperature in the feed oil passage 35; R denotes a relief valve for controlling the rise in the oil pressure inside the feed oil passage 35 and S8 and S9 denote oil pressure sensors for detecting the oil pressures inside the supply oil passages 92a and 92b, i.e., the supply oil pressures supplied to the clutches 51a and 51b, respectively.

The feed oil passage 35 and the first and second supply oil passages 92a and 92b can individually communicate through operations of the clutch actuators 91a and 91b. When the feed oil passage 35 and the first supply oil passages 92a are made to communicate with each other through the first clutch actuator 91a, a comparatively high oil pressure from the clutch oil pump 32 is supplied through the first supply oil passage 92a into the connection-side oil pressure chamber 54a of the first clutch 51a, whereby the first clutch 51a is put into the connected state. On the other hand, when the feed oil passage 35 and the second supply oil passage 92b are made to communicate with each other through the second clutch actuator 91b, the oil pressure from the clutch oil pump 32 is supplied through the second supply oil passage 92b into the connection-side oil pressure chamber 54b of the second clutch 51b, whereby the second clutch 51b is put into the connected state.

From the feed oil passage 35, an oil pressure relief oil passage 96a provided with an oil pressure relief valve 95 branches. The oil pressure relief valve 95 is operated by a valve actuator 95a so as to change over the opened/shut-off state of the oil pressure relief oil passage 96a The valve actuator 95a is operated under control of the above-mentioned electronic control unit 42. For example, at the time of starting of the engine, the oil pressure relief oil passage 96a is opened to return a feed oil pressure from the clutch oil pump 32 to the oil pan 36, and, after the engine is started, the oil pressure relief oil passage 96a is shut off so that the feed oil pressure can be supplied to the twin clutch 26.

The clutch actuators 91a and 91b are provided respectively with return oil passages 93a and 93b for returning the oil pressures from the clutch oil pump 32 into the oil pan when the communications between the feed oil passage 35 and the first and second supply oil passages 92a and 92b are cut off.

Figure 5:
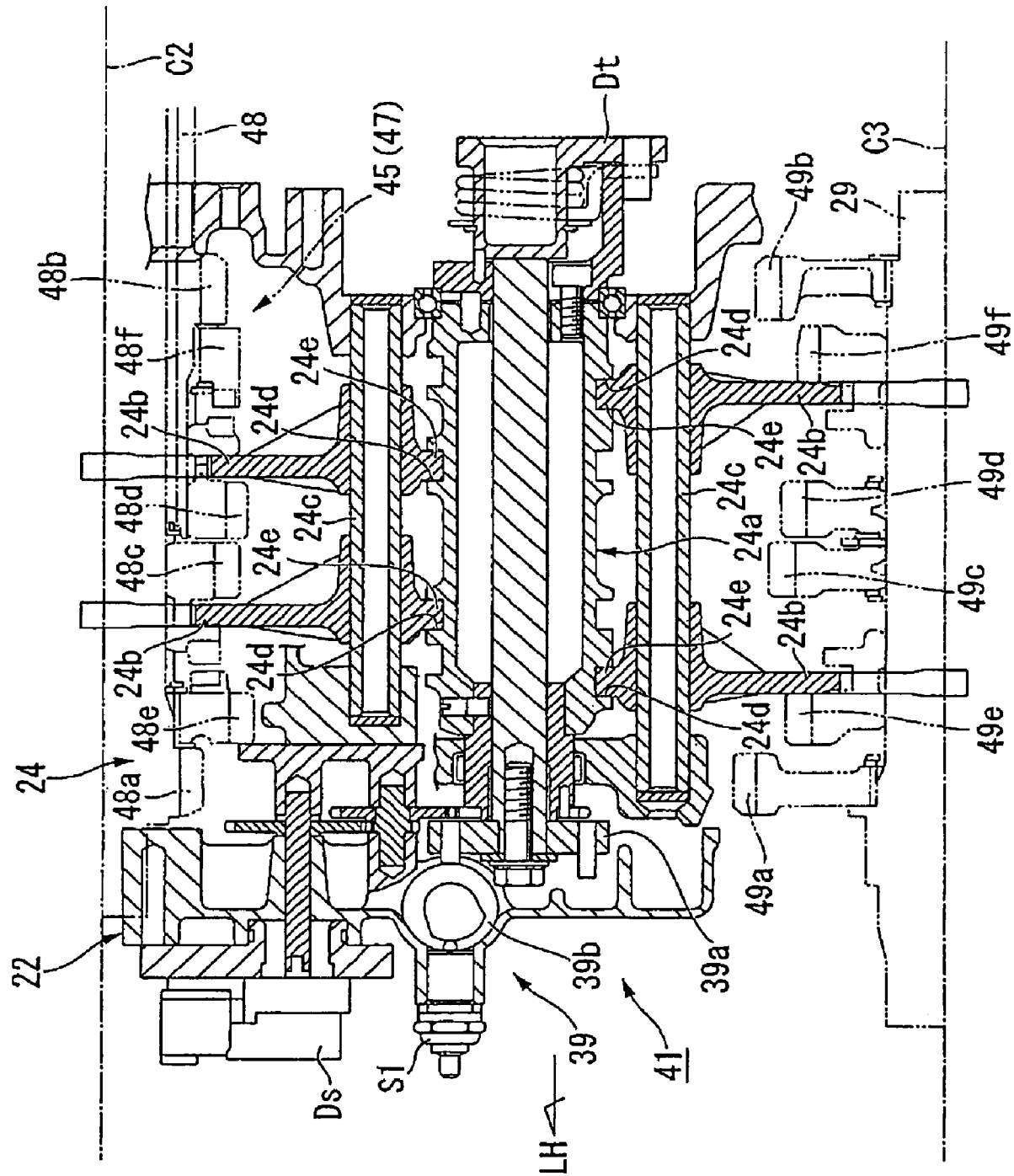
FIG. 5 is a sectional view of a change mechanism for operating the twin-clutch type transmission.

As shown in FIGS. 3 and 5, the change mechanism 24 has a configuration in which a plurality of (in this embodiment, four) shift forks 24b are moved in the axial direction by rotating a shift drum 24a disposed in parallel to the shafts 28 and 29, whereby the speed change gear pair (shift position) to be used for power transmission between the main shaft 28 and the counter shaft 29 is changed over.

Of the shift forks 24b, those extending to the side of the main shaft 28 form pairs with those extending to the side of the counter shaft 29, and the base end sides of them are axially movably supported on a pair of shift fork rods 24c, respectively. Each of the shift forks 24b is provided on the base end side thereof with a sliding projection 24e to be engaged with one of a plurality of cam grooves 24d formed in the outer periphery of the shift drum 24a. On the side of the main shaft 28 and on the side of the counter shaft 29, tip parts of the shift forks 24b are engaged with slide gears (described later) among the speed change gear group 45. When the shift drum 24a is rotated, the shift forks 24b are axially moved along the patterns of the cam grooves 24d, whereby the slide gears are moved in the axial direction, to change the shift position in the transmission 47 (namely, to make a gear shift).

The above-mentioned drive mechanism 39 is provided on one end side of the shift drum 24a. The drive mechanism 39 includes a pin gear 39a coaxially fixed to the shift drum 24a of the change mechanism 24, a worm-like barrel cam 39b engaged with the pin gear 39a, and an electric motor 39c for giving a rotational driving force to the barrel cam 39b. With the electric motor 39c driven, the shift drum 24a is rotated appropriately, to change the shift position in the transmission 47.

In FIGS. 3 and 5, S1 denotes a sensor for detecting the operating amount of the drive mechanism 39 for detecting the shift position in the transmission 47, DS denotes a rotational angle sensor for detecting the actual rotational angle of the shift drum 24a, and DT denotes a detent for determining the rotational angle on a shift position basis of the shift drum 24a.

As shown in FIG. 4, the transmission 47 is of the normally meshed system in which the drive gears 48a to 48f and the driven gears 49a to 49f corresponding respectively to the shift positions are normally meshed with each other. The gears are classified largely into fixed gears which can be rotated as one body with the support shaft (each of the shafts 28 and 29), free gears which can be rotated relative to the support shaft, and slide gears which can be integrally rotatable with and be axially movable relative to the support shaft.

More specifically, the drive gears 48a and 48b are fixed gears, the drive gears 48c and 48d are slide gears, and the drive gears 48e and 48f are free gears. In addition, the driven gears 49a to 49d are free gears, while the driven gears 49e and 49f are slide gears. Hereinafter, the gears 48, 48d, 49e, and 49f will be referred to as the slide gears, while the gears 48e, 48f, and 49a to 49d will be referred to as the free gears.

With an arbitrary one or ones of the slide gears slid (moved in the axial direction) appropriately by the change mechanism 24, power transmission using a speed change gear pair according to one of the shift positions can be achieved.

On one side of the slide gears 48c and 48d, slide rings Sc and Sd which can similarly be rotated integrally with the support shaft and be axially moved relative to the support shaft are provided integrally, respectively. The slide rings Sc and Sd are provided adjacently to the free gears 48e and 48f, respectively, in the axial direction. The slide rings Sc and Sd are provided with slide-side dogs (dowels) D1c and D1d, respectively. The free gears 48e and 48f are provided with free-side dogs (dowels) D1e and D1f corresponding to the slide-side dogs D1c and D1d, respectively.

On one side of the slide gears 49e and 49f, slide rings Se and Sf which can similarly be rotated integrally with the support shaft and be axially moved relative to the support shaft are provided integrally, respectively. The slide rings Se and Sf are provided adjacently to the free gears 49c and 49d, respectively, in the axial direction. The slide rings Se and Sf are provided with slide-side dogs (dowels) D2e and D2f, respectively. The free gears 49c and 49d are provided with free-side dogs (dowels) D2c and D2d corresponding to the slide-side dogs D2e and D2f, respectively.

Further, on the other side of the slide gears 49e and 49f, slide-side dogs (dowels) D3e and D3f are provided respectively, and the free gears 49a and 49b provided adjacently to them in the axial direction are provided with free-side dogs (dowels) D3e and D3f corresponding to the slide-side dogs D3e and D3f, respectively.

The slide-side dogs and the free-side dogs are relatively non-rotatably engaged with each other when the corresponding slide gears (inclusive of slide rings) and free gears come close to each other, and their engagement is canceled when the corresponding slide gears and free gears are spaced away from each other.

When one of the slide gears and the corresponding free gear are relatively non-rotatably engaged with each other through the dog, power transmission selectively using one of the speed change gear pairs can be achieved between the main shaft 28 and the counter shaft 29.

In addition, in the condition where no engagement is retained between the slide gears and the free gears (in the condition shown in FIG. 4), power transmission between both the shafts 28 and 29 is impossible, and this condition is a neutral condition of the transmission 47.

As shown in FIG. 3, the electronic control unit 42 controls the operations of the twin-clutch type transmission 23 and the gear shift device 41 to change the shift position in the transmission 47, based on not only the data sent from the above-mentioned sensors but also data sent from a throttle sensor TS for detecting the position and the opening speed of a throttle valve in the throttle body 16, a storage sensor (switch) SS for a side stand (or a center stand), a wheel speed sensor WS for the front wheel 2, and, for example, a mode switch SW1, a gear selection switch SW2, a neutral/drive changeover switch SW3 and the like which are provided on the steering handle 4a.

The transmission modes selected by the mode switch SW1 include a full-automatic mode in which the shift position in the transmission 47 is automatically changed over on the basis of vehicle data such as vehicle speed (wheel speed), engine speed, etc., and a semi-automatic mode in which the shift position in the transmission 47 can be changed over by only operating the selection switch SW2 on the basis of the driver's will. The current transmission mode and the current shift position are displayed, for example, on a meter device M provided in the vicinity of the steering handle 4a. In addition, a changeover of the transmission 47 between a condition where power transmission can be made at a predetermined shift position and the neutral condition can be made by operating the neutral/drive changeover switch SW3.

In FIG. 3, S2 denotes a vehicle speed sensor which detects the rotating speed of the main shaft 28 (or detects the rotating speed of the drive gear 48e meshed with the driven gear 49e rotated as one body with the counter shaft 29) for detection of the vehicle speed, and S3 denotes a rotating speed sensor for detecting the rotating speed of the primary driven gear 58 for detection of the engine speed (the rotating speed of the crankshaft 21). The electronic control unit 42 shares the data from the sensors with an ECU 42a for a fuel injection system.

As shown in FIG. 4, the twin clutch 26 has a structure in which the first clutch 51a connected to the speed change gear pairs for odd-ordinal shift positions is disposed on the right side in the clutch case 25 (on the outer side in the vehicle width direction), and the second clutch 51b connected to the speed change gear pairs for even-ordinal shift positions is disposed on the left side in the clutch case 25 (on the inner side in the vehicle width direction). The clutches 51a and 51b are wet-type multiple disk clutches having a plurality of clutch disks (clutch disks 61a, 61b and clutch plates 66a, 66b) mutually overlapped in the axial direction thereof.

The clutches 51a, 51b are hydraulic in which pressure plates 52a, 52b are displaced in the axial direction by supply of oil pressures supplied externally so as to obtain predetermined engaging forces. The clutches 51a, 51b include return springs 53a, 53b for urging the pressure plates 52a, 52b toward the clutch disconnection side; connection-side oil pressure chambers 54a, 54b for exerting pressures toward the clutch connection side on the pressure plates 52a, 52b and disconnection-side oil pressure chambers 55a, 55b for exerting pressures toward the clutch disconnection side on the pressure plates 52a, 52b so as to assist the returning motions of the pressure plates 52a, 52b.

The disconnection-side oil pressure chambers 55a, 55b are normally supplied with comparatively low oil pressures from the main oil pump, whereas the connection-side oil pressure chambers 54a, 54b are supplied with comparatively high oil pressures from the oil pressure supply system 46 (clutch oil pump 32) selectively and individually.

The clutches 51a, 51b are configured to be roughly the same in diameter, while having the single clutch outer 56 in common. The clutch outer 56 has a bottomed cylindrical shape opened to the right side, and a central part of a bottom part thereof is relatively rotatably supported on an intermediate part in the left-right direction of the outer shaft 44. A clutch center 57a of the first clutch 51a is disposed on the right inner side of the clutch outer 56, while a clutch center 57b of the second clutch 51b is disposed on the left inner side of the clutch outer 56. The clutch center 57a is integrally rotatably supported on a right end part of the inner shaft 43, whereas the clutch center 57b is integrally rotatably supported on a right end part of the outer shaft 44.

The primary driven gear 58 is attached to the left side of the bottom part of the clutch outer 56, through a spring damper 59. The primary driven gear 58 is meshed with the primary drive gear 58a of the crankshaft 21. Thus, the rotational power of the crankshaft 21 is inputted to the clutch outer 56 through the spring damper 59. Attendant on the rotation of the crankshaft 21, the clutch outer 56 is rotated independently of the main shaft 28.

The clutch outer 56 is integrally rotatably provided with a drive sprocket 56b for driving each of the oil pumps, on the left side relative to the primary driven gear 58. The plurality of clutch plates 61a for the first clutch 51a are integrally rotatably supported on the right inner periphery of the clutch outer 56, while the plurality of clutch plates 61b for the second clutch 51b are integrally rotatably supported on the left inner periphery of the clutch outer 56.

The outer periphery of the clutch outer 56 is provide with a plurality of engaging grooves along the axial direction, while the outer peripheries of the clutch plates 61a, 61b are each provided with a plurality of engaging projections corresponding to the engaging grooves, respectively. The engaging projections are relatively non-rotatably engaged with the engaging grooves, whereby the clutch plates 61a and 61b are integrally rotatably supported on the clutch outer 56.

A flange part 64a on the left side of the clutch center 57a of the first clutch 51a is provided with an inner wall part 65a erected rightwards, and the plurality of clutch disks (friction plates) 66a are integrally rotatably supported on the outer periphery of the inner wall part 65a.

The outer periphery of the clutch center 57a is provided with a plurality of engaging grooves along the axial direction, while the inner periphery of each of the clutch disks 66a is provided with a plurality of engaging projections corresponding to the engaging grooves. The engaging projections are relatively non-rotatably engaged with the engaging grooves, whereby each of the clutch disks 66a is integrally rotatably supported on the clutch center 57a.

The above-mentioned pressure plate 52a is disposed on the right side of and oppositely to the flange part 64a. Between the outer periphery side of the pressure plate 52a and the outer periphery side of the flange part 64a, the clutch plates 61a and the clutch disks 66a are arranged in such a stacked state so as to overlap each other in the axial direction.

Between the inner periphery side of the pressure plate 52a and the inner periphery side of the flange part 64a, the above-mentioned disconnection-side oil pressure chamber 55a is formed, and the return spring 53a for urging the pressure plate 52a toward the right side (the side for spacing away from the flange part 64a, namely, the clutch disconnection side) is disposed.

A support flange part 67a provided at the outer periphery of a central tubular part 62a on the right side of the clutch center 57a is disposed on the right side of and oppositely to the inner periphery side of the pressure plate 52a. Between the support flange part 67a and the inner periphery side of the pressure plate 52a, the above-mentioned connection-side oil pressure chamber 54a is formed, and the return spring 53a is disposed.

On the other hand, a flange part 64b on the left side of the clutch center 57b of the second clutch 51b is provided with an inner wall part 65b erected toward the right side, and the plurality of clutch disks 66b are integrally rotatably supported on the outer periphery of the inner wall part 65b.

The outer periphery of the clutch center 57b is provided with a plurality of engaging grooves along the axial direction, while the inner periphery of each of the clutch disks 66b is provided with a plurality of engaging projections corresponding to the engaging grooves. The engaging projections are integrally non-rotatably engaged with the engaging grooves, whereby each of the clutch disks 66b is integrally rotatably supported on the clutch center 57b.

The above-mentioned pressure plate 52b is disposed on the right side of and oppositely to the flange part 64b. Between the outer periphery side of the pressure plate 52b and the outer periphery side of the flange part 64b, the clutch plates 61b and the clutch disks 66b are arranged in such a stacked state as to overlap each other in the axial direction.

Between the inner periphery side of the pressure plate 52b and the inner periphery side of the flange part 64b, the above-mentioned disconnection-side oil pressure chamber 55b is formed, and the return spring 53b for urging the pressure plate 52b toward the right side (the side for spacing away from the flange part 64, namely, the clutch disconnection side) is disposed.

A support flange part 67b provided at the outer periphery of a central tubular part 62b on the right side of the clutch center 57b is disposed on the right side of and oppositely to the inner periphery side of the pressure plate 52b. Between the support flange part 67b and the inner periphery side of the pressure plate 52b, the above-mentioned connection-side oil pressure chamber 54b is formed, and the return spring 53b is disposed.

A clutch cover 69 constituting the right side of the clutch case 25 is provided with the first supply oil passage 92a, the second supply oil passage 92b, and an in-cover main supply oil passage 71a. In addition, oil passages communicating individually with the oil passages 92a, 92b, and 71a are appropriately formed inside a right hollow part 43a of the inner shaft 43.

As a result, the oil pressure from the clutch oil pump 32 can be supplied into the connection-side oil pressure chamber 54b of the second clutch 51b through the second supply oil passage 92b and the like; the oil pressure from the main oil pump can be supplied into the disconnection-side oil pressure chamber 55a of the first clutch 51a through the in-cover main supply oil passage 71a and the like and the oil pressure from the clutch oil pump 32 can be supplied into the connection-side oil pressure chamber 54a of the first clutch 51a through the first supply oil passage 92a and the like. In addition, the oil pressure from the main oil pump can be supplied into the disconnection-side oil pressure chamber 55b of the second clutch 51b through the main supply oil passage 71 and the like.

In the condition where the engine is stopped (each of the oil pumps is stopped), the clutches 51a, 51b are each in the clutch disconnection condition in which the pressure plates 52a, 52b are displaced to the right side by the urging forces of the return springs 53a, 53b, and the frictional engagement of the clutch plates 61a, 61b and the clutch disks 66a, 66b is canceled. In addition, in the condition where the engine is operated and where the supply of the oil pressure from the oil pressure supply system 46 is stopped, the urging forces of the return springs 53a, 53b and the oil pressures in the disconnection-side oil pressure chambers 55a, 55b are exerted on the pressure plates 52a, 52b, so that the clutch disconnection condition is obtained in the same manner as just described above.

On the other hand, in the first clutch 51a, in the condition where the engine is operated and where a comparatively high oil pressure is supplied from the oil pressure supply system 46 into the connection-side oil pressure chamber 54a, the pressure plate 52a is moved toward the left side (the side of the flange part 64a, namely, the clutch connection side) against the oil pressure in the disconnection-side oil pressure chamber 55a and the urging force of the return spring 53a, and the clutch plates 61a and the clutch disks 66a are clamped from both sides and put into frictional engagement with each other, resulting in a clutch connection condition where power transmission is possible between the clutch outer 56 and the clutch center 57a.

Similarly, in the second clutch 51b, in the condition where the engine is operated and where a comparatively high oil pressure is supplied from the oil pressure supply system 46 into the connection-side oil pressure chamber 54b, the pressure plate 52b is moved toward the left side (the side of the flange part 64b, namely, the clutch connection side) against the oil pressure in the disconnection-side oil pressure chamber 55b and the urging force of the return spring 53b, and the clutch plates 61b and the clutch disks 66b are clamped from both sides and put into frictional engagement with each other, resulting in a clutch connection condition where power transmission is possible between the clutch outer 56 and the clutch center 57b.

In addition, when the supply of the oil pressure into the connection-side oil pressure chamber 54a, 54b is stopped starting from the clutch connection condition of the clutch 51a, 51b, the pressure plate 52a, 52b is displaced toward the right side by the oil pressure in the disconnection-side oil pressure chamber 55a, 55b and the urging force of the return spring 53a, 53b, and the frictional engagement of the clutch plates 61a, 61b and the clutch disks 66a, 66b is canceled, resulting in the clutch disconnection condition where power transmission between the clutch outer 56 and the clutch center 57a, 57b is impossible.

The engine oil supplied into the disconnection-side oil pressure chamber 55a, 55b of the clutch 51a, 51b is led to the exterior of the oil pressure chamber through the oil passages formed appropriately in the inner wall part 65a, 65b and the like, and is appropriately supplied to the clutch plates 61a, 61b and the clutch disks 66a, 66b provided at the outer periphery of the inner wall part 65a, 65b. By thus relieving the working oil present in the disconnection-side oil pressure chamber 55a, 55b, the oil pressure inside the disconnection-side oil pressure chamber 55a, 55b is maintained at a predetermined low pressure, and the lubrication and cooling performances for the clutch plates 61a, 61b and the clutch disks 66a, 66b in the clutch 51a, 51b being in the disconnected state are enhanced.

In the twin-clutch type transmission 23 as described above, in the case where the engine of the motorcycle 1 has been started but the vehicle is determined to be in a stopped state through detection of the erected state of the side stand or the like, both the clutches 51a and 51b are maintained in the clutch disconnection condition. Then, for example when the side stand is stored or any of the switches SW1, SW2 and SW3 is operated, the transmission 47 is brought from the neutral condition into a 1st speed condition where power transmission using the 1st speed gear (starting gear, namely, the speed change gear pair 45a) is possible, as preparation for starting of the motorcycle 1. With the engine speed raised, for example, starting from this condition, the first clutch 51a is brought into the clutch connection condition through a half-clutch condition, whereby the motorcycle 1 is started to operate.

When the motorcycle 1 is operating, only one of the clutches 51a and 51b that corresponds to the current shift position is in the connected state, whereas the other is in the disconnected state. This ensures that power transmission through one of the inner and outer shafts 43 and 44 and through one of the speed change gear pairs 45a to 45f is performed. In this case, based on the vehicle data, the electron control unit 42 controls the operation of the twin-clutch type transmission 23, so as to preliminarily produce a condition where power transmission using a speed change gear pair corresponding to the next shift position is possible.

More specifically, when the current shift position is, for example, an odd-ordinal position (or an even-ordinal position), the next shift position is an even-ordinal position (or an odd-ordinal position). Therefore, a condition where power transmission using a speed change gear pair corresponding to the even-ordinal position (or the odd-ordinal position) is possible and is preliminarily produced.

In this case, the first clutch 51a is in the connected state but the second clutch 51b (or the first clutch 51a) is in the disconnected state, so that the engine output (the rotational power of the crankshaft 21) is transmitted to neither the outer shaft 44 (or the inner shaft 43) and the speed change gear pair corresponding to the even-ordinal position (or the odd-ordinal position).

Thereafter, when it is determined by the electronic control unit 42 that a timing for shifting has been reached, a shift to the power transmission using the speed change gear pair corresponding to the preliminarily selected next shift position can be achieved, by only putting the first clutch 51a (or the second clutch 51b) into the disconnected state and putting the second clutch 51b (or the first clutch 51a) into the connected state. This makes it possible to achieve a swift and smooth gear shift such that a time lag in shifting the gear is not generated and that an interruption of power transmission is not generated.

Figure 6:
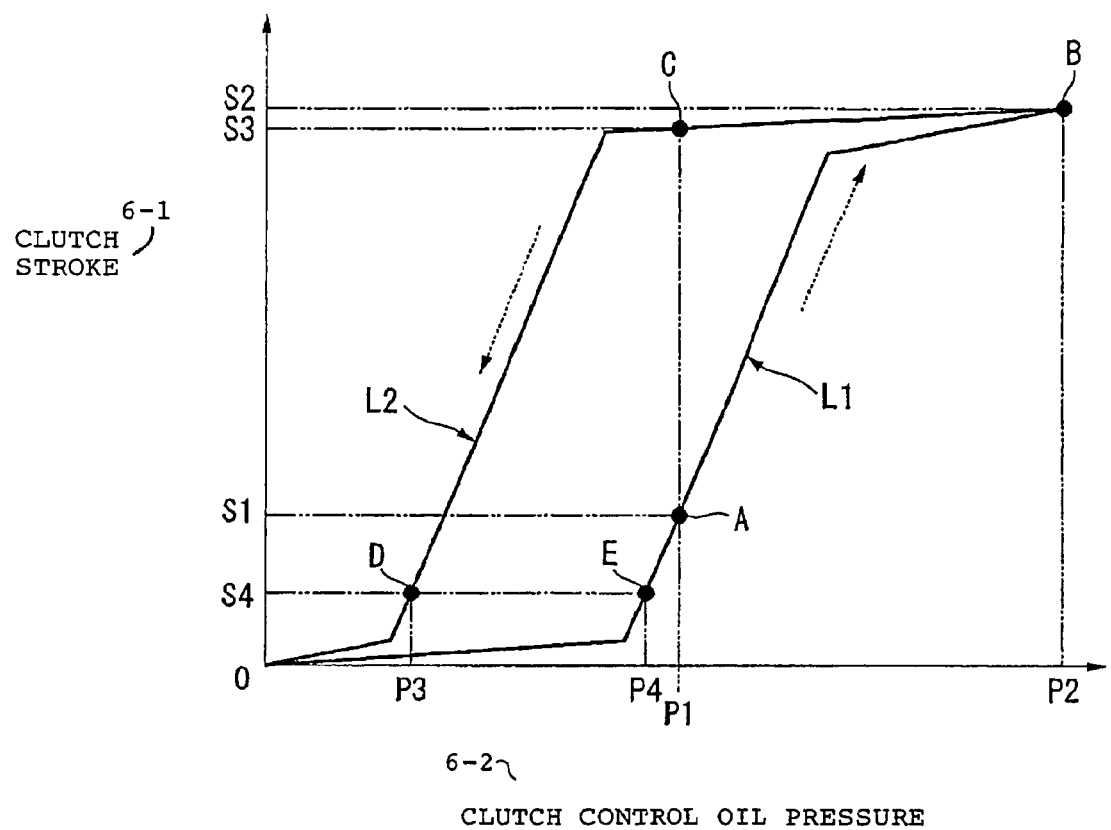
FIG. 6 is a graph showing the relation between clutch stroke and clutch control oil pressure, for a twin clutch in the twin-clutch type transmission.

FIG. 6 is a graph showing the relation (oil pressure-stroke characteristic) between the supply oil pressure (clutch control oil pressure) supplied into the connection-side oil pressure chamber 54a of the first clutch 51a, for example, and the stroke (clutch stroke) of the pressure plate 52a of the first clutch 51a.

In FIG. 6, line L1 shows the variation in the clutch stroke when the clutch control oil pressure is increased (when the clutch is connected), and line L2 shows the variation in the clutch stroke when the clutch control oil pressure is decreased (when the clutch is disconnected).

More specifically, in the oil pressure-stroke characteristic of the first clutch 51a, a hysteresis phenomenon is generated in which, even at the same clutch control oil pressure, the clutch stroke differs depending on the path of variation in the clutch control oil pressure (depending on whether the clutch control oil pressure is increased (when the clutch is connected) or decreased (when the clutch is disconnected)). In addition, the second clutch 51b similarly has the characteristic as shown in FIG. 6.

Point A on line L1 indicates a point at which an oil pressure required for canceling the chattering and an operating reaction force toward the connection side of the first clutch 51a is given to fill the oil pressure passage 92a extending to the connection-side oil pressure chamber 54a by increasing the clutch control oil pressure while maintaining the disconnected state of the first clutch 51a. By causing the first clutch 51a before connection to stand by at point A, an oil pressure increment necessary for canceling the chattering and the operating reaction force and for filling the oil pressure passage with the oil pressure at the time of connecting the clutch (namely, the oil pressure increment which is ineffective for a clutch connection operation) is omitted, and the response of the clutch connection operation is enhanced. Hereinafter, the clutch control oil pressure at point A will be referred to as an allowance compensating oil pressure (stand-by oil pressure) P1, and the clutch stroke at point A will be referred to as an allowance compensating stroke S1.

In addition, point B in FIG. 6 indicates a point at which the first clutch 51a is put into the connected state by increasing both the clutch control oil pressure and the clutch stroke. Oil pressure P2 indicates the clutch control oil pressure (connection oil pressure) at point B, and a stroke S2 indicates the clutch stroke (connection stroke) at point B.

Further, point C on line L2 indicates a point where the clutch control oil pressure of the first clutch 51a in the connected state is lowered from the connection oil pressure P2 to the allowance compensating oil pressure P1, and a stroke S3 indicates the clutch stroke at point C.

The stroke S3 at point C is greater than the allowance compensating stroke S1 at point A. In other words, in changing over the first clutch 51a from the connected state into the disconnected state, upon simple lowering of the clutch control oil pressure to the allowance compensating oil pressure P1, the clutch stroke may not necessarily be returned to the allowance compensating stroke S1. Thus, a drag of the first clutch 51a may be generated.

On the other hand, in this embodiment, in bringing the first clutch 51a from the connected state into the disconnected state, the clutch control oil pressure and the clutch stroke are decreased from point B along line L2 to an oil pressure P3 and a stroke S4 being below the allowance compensating oil pressure P1 and the allowance compensating stroke S1 and being near 0, and thereafter they are led to point A on line L1.

The point on line L2 at which the oil pressure P3 and the stroke S4 are attained is referred to as point D. Then, even if the clutch control oil pressure is increased from point D, the influence of the hysteresis inhibits the clutch stroke from being increased immediately. More specifically, point E on line L1 at which the oil pressure P4 and the stroke S4 are attained is reached, and, thereafter, the clutch control oil pressure and the clutch stroke are increased along line L1, to reach point A.

In operation of the configuration as above, first, when an ignition switch is turned ON and the engine 13 is started, the clutch oil pump 32 is driven to generate an oil pressure, part of which is supplied through linear solenoids into the connection-side oil pressure chambers 54a, 54b of the clutches 51a, 51b. The oil pressure thus supplied serves as the allowance compensating oil pressure P1, and the allowance compensating stroke S1 is generated at the clutch 51a or 51b which is in the disconnected state.

With the clutch control oil pressure increased starting from this condition, the pressure plate 52a, 52b can be linearly stroked, while omitting the ineffective oil pressure increment from the time when the increase in the oil pressure is started. As a result, a speedy clutch connecting operation can be achieved.

Accordingly, it is possible to suppress an operational delay at the time of connecting the clutch, to achieve speedy and smooth vehicle starting and speed change (gear shift), and to enhance the drivability of the motorcycle 1.

In bringing the clutch 51a, 51b from the connected state into the disconnected state, the control oil pressure at the clutch 51a, 51b is decreased to the oil pressure P3 being below the allowance compensating oil pressure P1 and being near 0, and thereafter it is increased again through the oil pressure P4, to reach the allowance compensating oil pressure P1.

Consequently, it is possible to bring the clutch 51a, 51b into the completely disconnected state while suppressing the influence of the hysteresis present in oil pressure-stroke characteristic, to prevent a drag of the clutch 51a, 51b from occurring under the influence of the hysteresis, to enhance the durability of the twin clutch 26, and to contrive a reduction in fuel consumption of the motorcycle 1.

In the clutch control system, it is detected, based on vehicle speed data sent from the vehicle speed sensor S2, whether or not the motorcycle 1 is in a stopped state. When it is detected that the motorcycle 1 is in the stopped state, the clutch control oil pressure is lowered to the oil pressure P3 being below the allowance compensating oil pressure P1 and being near 0, and, thereafter, the clutch control oil pressure is again increased to reach the allowance compensating oil pressure P1.

This makes it possible to securely prevent a drag of the clutch 51a, 51b from occurring, especially where the motorcycle 1 is stopped.

As has been described above, the clutch control system for the motorcycle 1 in the embodiment above has the hydraulic type twin clutch 26 which is provided in the path of power transmission between the engine 13 and the rear wheel 11 and which is put into the connected state by a supply oil pressure supplied externally. When one clutch in the twin clutch 26 is disconnected, the control oil pressure thereof is maintained at a predetermined stand-by oil pressure (allowance compensating oil pressure) P1. At the time of connecting the one clutch, the control oil pressure thereof is increased to a predetermined connection oil pressure P2. At the time of bringing the one clutch from the connected state into the disconnected state, the control oil pressure thereof is lowered to an oil pressure P3 being below the stand-by oil pressure P1 and being near 0, and is thereafter increased again to the stand-by oil pressure P1.

According to this configuration, the control oil pressure of the one clutch is maintained in the predetermined stand-by oil pressure P1 when the one clutch is disconnected, whereby it is made possible to cancel the chattering and an operating reaction force of the clutch and to exert a precompression onto the oil pressure line, thereby enhancing the operation response at the time of clutch connection.

At the time of bringing the one clutch from the connected state into the disconnected state, the control oil pressure thereof is lowered to an oil pressure P3 being below the stand-by oil pressure P1 and being near 0 (near the atmospheric pressure), and is thereafter increased again to the stand-by oil pressure P1, whereby it is made possible to bring the clutch into a completely disconnected state while obviating the influence of the hysteresis present in the oil pressure-stroke characteristic, and to prevent a drag of the clutch from occurring under the influence of the hysteresis.

In the clutch control system as above, in the case where it is detected through detection of vehicle speed of the motorcycle 1 that the motorcycle 1 is in a stopped state, the one clutch is brought from the connected state into the disconnected state through a process in which the control oil pressure of the clutch is lowered to an oil pressure P3 being below the stand-by oil pressure P1 and being near 0, and is thereafter increased again to the stand-by oil pressure P1, whereby a drag of the one clutch when the motorcycle 1 is in the stopped state can be securely prevented from occurring.

Further, in the clutch control system as described above, the stand-by oil pressure P1 is an oil pressure for compensating the allowance pressure (ineffective pressure) at the one clutch, whereby the operation response at the time of clutch connection can be enhanced efficiently.

Furthermore, in the clutch control system as described above, the twin clutch 26 is used for a twin-clutch type transmission control system in which the shift position is changed over by shifting from one of the pair of clutches 51a and 51b to the other. This ensures that, in the twin clutch 26 needed to stand by in the disconnected state before clutch connection, it is possible to suppress the operational delay at the time of shifting from one clutch to the other, and to prevent a drag of the twin clutch 26 from occurring at the time of stand-by.

In addition, the present invention is not limited to the above-described embodiment, and is also applicable to, for example, a system having a single clutch instead of a twin clutch.

In addition, the engine to which the present invention is applied may be a single-cylinder engine, a V-type engine, a horizontal opposed type engine, or the like, and may for example be a longitudinal engine having a crankshaft set along the front-rear direction of a vehicle.

Further, the vehicle to which the present invention is applied is not limited to a motorcycle, and may be a three-wheel or four-wheel saddle ride type vehicle, or may be a motor scooter type vehicle having a low-floor foot rest part.

In addition, the configuration in the embodiment described above is an example of the present invention. The present invention may also be applied to four-wheel passenger cars and the like, and, naturally, various modifications are possible within the scope of the gist of the invention.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A clutch control system for a vehicle having a hydraulic type clutch and an oil pressure supply system, the clutch being provided in a power transmission path between an engine and a drive wheel and being positioned into either a connected state or a disconnected state by supplying an oil pressure for controlling said clutch through an oil feed path of the oil pressure supply system, the clutch control system comprising:
   an ECU communicating with the oil pressure supply system and with a plurality of sensors which detect a throttle opening amount, an oil pressure in the oil feed path, an engine operating state, a vehicle speed, and a gear selection switch, and
   based on a signal from at least one of the plurality of sensors, the ECU changes the oil pressure in the oil feed path in order to change the state of said clutch between the connected state and the disconnected state,
   wherein said oil pressure for controlling said clutch is maintained at a predetermined stand-by oil pressure (P1) when said clutch is in the disconnected state;
   said oil pressure is increased from the stand-by oil pressure (P1) to a predetermined connection oil pressure (P2) when said clutch is in the connected state; and
   at a time of bringing said clutch from said connected state to the disconnected state, said oil pressure is lowered to an oil pressure (P3) below said stand-by oil pressure (P1), and is thereafter increased again to said stand-by oil pressure (P1),
   wherein the pressure (P2)>the pressure (P1)>the pressure (P3)>0.

2. The clutch control system for a vehicle as set forth in claim 1, wherein said oil pressure for controlling said clutch is lowered to the oil pressure (P3) below said stand-by oil pressure (P1), and is thereafter increased again to said stand-by oil pressure (P1), at the time of bringing said clutch from said connected state to said disconnected state, in the case where it is detected by the vehicle speed sensor that said vehicle is in a stopped state.

3. The clutch control system for a vehicle as set forth in claim 1, wherein said stand-by oil pressure (P1) is an oil pressure for compensating an allowance pressure at said clutch.

4. The clutch control system for a vehicle as set forth in claim 2, wherein a clutch stroke (S1) at a time when the oil pressure is the stand-by oil pressure (P1) and the clutch is in the connected state is greater than a clutch stroke (S4) at a time when the oil pressure is the oil pressure (P3) and the clutch is in the disconnected state.

5. The clutch control system for a vehicle as set forth in claim 1, wherein said clutch is a twin clutch of a twin-clutch type transmission control system in which a gear shift is made by shifting from one of a pair of clutches to the other.

6. The clutch control system for a vehicle as set forth in claim 2, wherein a clutch stroke differs depending on whether the oil pressure controlling the clutch is increased when the clutch is connected, or is decreased when the clutch is disconnected.

7. The clutch control system for a vehicle as set forth in claim 1, wherein said clutch is a twin clutch of a twin-clutch type transmission control system, wherein the two clutches are disposed directly adjacent to each other.

8. The clutch control system for a vehicle as set forth in claim 1, wherein said clutch is a twin clutch of a twin-clutch type transmission control system, wherein the two clutches share a single clutch outer.

9. The clutch control system for a vehicle as set forth in claim 1, wherein the connection oil pressure (P2) is controlled based on vehicle speed.

10. The clutch control system for a vehicle as set forth in claim 1, and further including a side stand, wherein upon moving the side stand to an erected state a side stand switch is actuated for maintaining the oil pressure at a predetermined stand-by oil pressure (P1).

11. A method for controlling a clutch for a vehicle having a hydraulic type clutch and an oil pressure supply system provided in a power transmission path between an engine and a drive wheel and is positionable into either a connected state or a disconnected state by supplying an oil pressure for controlling said clutch through an oil feed path of the oil pressure supply system, comprising the following steps:
   maintaining an oil pressure for controlling said clutch at a predetermined stand-by oil pressure (P1) when said clutch is in the disconnected state;
   increasing said oil pressure from the stand-by oil pressure (P1) to a predetermined connection oil pressure (P2) when said clutch is in the connected state; and
   at a time of bringing said clutch from said connected state to the disconnected state, lowering said oil pressure to an oil pressure (P3) which is below said stand-by oil pressure (P1), and thereafter
   increasing the oil pressure again to said stand-by oil pressure (P1),
   wherein the pressure (P2)>the pressure (P1)>the pressure (P3)>0.

12. The method for controlling a clutch for a vehicle as set forth in claim 11, wherein said oil pressure for controlling said clutch is lowered to the oil pressure (P3) being below said stand-by oil pressure (P1), and is thereafter increased again to said stand-by oil pressure (P1), at the time of bringing said clutch from said connected state to said disconnected state in the case by detecting that said vehicle is in a stopped state.

13. The method for controlling a clutch for a vehicle as set forth in claim 11, wherein said stand-by oil pressure (P1) is an oil pressure for compensating an allowance pressure at said clutch.

14. The method for controlling a clutch for a vehicle as set forth in claim 12, wherein a clutch stroke differs depending on whether the oil pressure controlling the clutch is increased when the clutch is connected, or is decreased when the clutch is disconnected.

15. The method for controlling a clutch for a vehicle as set forth in claim 11, wherein said clutch is a twin clutch of a twin-clutch type transmission control system in which a gear shift is made by shifting from one of a pair of clutches to the other.

16. The method for controlling a clutch for a vehicle as set forth in claim 12, wherein the method is performed using a clutch control system, comprising:
- an ECU communicating with the oil pressure supply system and with a plurality of sensors which detect a throttle opening amount, an oil pressure in the oil feed path, an engine operating state, a vehicle speed, and a gear selection switch, and
- based on a signal from at least one of the plurality of sensors, the ECU changes the oil pressure in the oil feed path in order to change the state of said clutch between the connected state and the disconnected state.

17. The method for controlling a clutch for a vehicle as set forth in claim 11, wherein said clutch is a twin clutch of a twin-clutch type transmission control system, wherein the two clutches are disposed directly adjacent to each other.

18. The method for controlling a clutch for a vehicle as set forth in claim 11, wherein said clutch is a twin clutch of a twin-clutch type transmission control system, wherein the two clutches share a common clutch outer.

19. The method for controlling a clutch for a vehicle as set forth in claim 11, and further controlling the connection oil pressure (P2) based on vehicle speed detecting a vehicle speed.

20. The method for controlling a clutch for a vehicle as set forth in claim 11, and further including a side stand, wherein upon moving the side stand to an erected state a side stand switch is actuated for maintaining the oil pressure at a predetermined stand-by oil pressure (P1).

* * * * *